United States Patent Office 3,558,623
Patented Jan. 26, 1971

3,558,623
AMIDE PHOSPHORIC AND THIOPHOSPHORIC ACID AMIDE ESTERS
Hans Helfenberger, Reinach, Basel-Land, Switzerland, assignor to Sandoz Ltd., Basel, Switzerland, a corporation of Switzerland
No Drawing. Filed Jan. 12, 1968, Ser. No. 697,331
Claims priority, application Switzerland, Jan. 13, 1967, 513/67
Int. Cl. C07d 51/78
U.S. Cl. 260—250
19 Claims

ABSTRACT OF THE DISCLOSURE

Pesticidal agents constituted by novel phosphoric and thiophosphoric acid amide esters of the formula

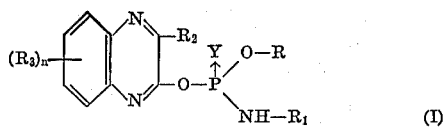

wherein

R is lower alkyl (e.g. methyl, ethyl, propyl, butyl, etc.),
$R_1$ is lower alkyl (1 to 4 carbon atoms),
$R_2$ is hydrogen atom or the methyl or methoxy radical,
$R_3$ is a hydrogen atom, a halogen atom, a lower alkyl radical or the nitro radical,
Y is O or S, and
n is 1 or 2, are prepared and spraying powders and aqueous emulsions containing them are used to protect beans and other plants from plant pests; tests showing both dry and direct spraying contact effect and feed effect against *Bruchidius obtectus*, *Anagesta kuehniella*, and *Carausius morosus* are given.

The present invention provides compounds which have the formula

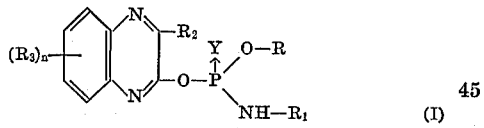

wherein

R is lower alkyl (e.g. methyl, ethyl, propyl, butyl, etc.),
$R_1$ is lower alkyl (1 to 4 carbon atoms),
$R_2$ is a hydrogen atom or the methyl or methoxy radical,
$R_3$ is a hydrogen atom, a halogen atom (e.g. chlorine or bromine), lower alkyl (e.g. methyl or ethyl) or the nitro radical,
Y is an oxygen or sulphur atom, and
n is 1 or 2.

When two radical $R_3$ are contained in a compound I, these radicals may be different from one another; furthermore, all of R, $R_1$, $R_2$ and $R_3$ can represent methyl, i.e. these radicals need not be dissimilar.

The present invention also provides a process for the production of the compounds of Formula I, which is characterized in that a compound of the formula

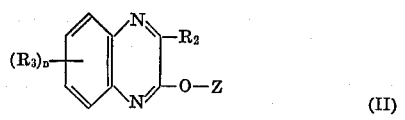

wherein Z represents a cation and n, $R_2$ and $R_3$ are as defined above, is reacted with a compound of the formula

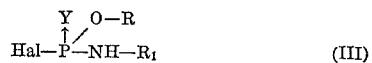

wherein Hal represents chlorine or bromine, and R, $R_1$ and Y are as defined above.

Suitably the reaction of the process of the invention is effected in a polar inert solvent. Examples of suitable solvents are acid amides (e.g. dimethylformamide- or acetamide), ethers (e.g. dioxan, dimethoxy- or diethoxy-ethane), chloroform, carbon tetrachloride, dimethylsul-phoxide; especially suitable polar solvents are ketones (e.g. acetone, methylethyl ketone or methylisobutyl ketone) and nitriles (e.g. acetonitrile). Furthermore, it is possible to effect the reaction of the process of the invention in a mixture of a polar and a non-polar solvent, e.g. a mixture of (i) dimethylformamide with (ii) benzene, toluene, xylene or chlorobenzene; or a mixture of (i) acetonitrile with (ii) xylene.

The reaction temperatures used in the process of the invention may vary within wide limits, e.g. between 0° C. and 80° C., advantageously from 0° C. to 50° C. for those compounds of the Formula III wherein Y represents O, and from 20° C. to 70° C. for those compounds of the Formula III wherein Y represents S.

Suitable hydroxyquinoxalines from which the compounds of Formula II are derived are, for example, 2-hydroxyquinoxaline, 2 - hydroxy - 3 - methylquinoxaline, 2-hydroxy-6 (or 7)-chloroquinoxaline, 2-hydroxy-6 (or 7)-nitroquinoxaline, 2 - hydroxy-6,7-dimethylquinoxaline, 2-hydroxy-3-methyl-6 (or 7)-nitroquinoxaline, 2-hydroxy-3,6 (or 7)-dimethylquinoxaline. Most of these easily obtainable intermediate products are known (see e.g. Bl. 1963, 356; Soc. 1945, 662; Am. Soc. 76, 4483 (1954); Soc. 1964, 4056); the remaining ones may easily be obtained using methods described in the above mentioned passages from the literature on the subject.

Suitable compounds of the Formula III are, for example:

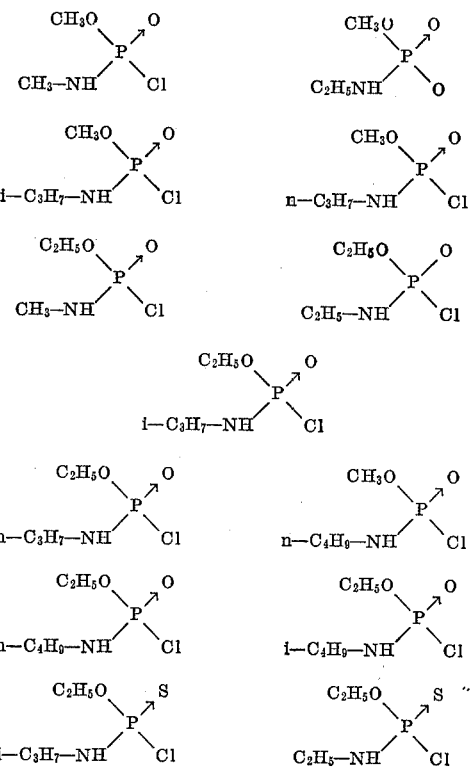

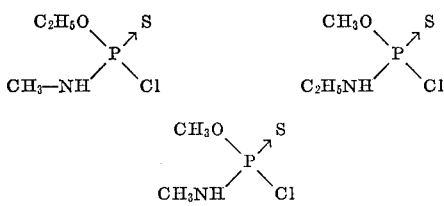

Cations Z which may be used advantageously are metallic cations, preferably of the alkali metal or alkaline earth metal series (e.g. sodium, potassium, calcium or barium) and silver, but also tertiary amines, e.g. triethylamine or trimethylamine.

A metal salt of a 2-hydroxyquinoxaline in the form of dry powder is suitably produced by reacting a 2-hydroxyquinoxaline with an equimolecular amount of a metal alcoholate in an anhydrous alcohol, e.g. of sodium methylate in methanol, and evaporating the alcohol. Another suitable production method consists in suspending a 2-hydroxyquinoxaline in a suspension medium such as toluene or xylene and effecting the reaction at temperatures of, e.g., 80° to 140° C. with sodium hydroxide powder, while distilling off the water being formed.

The compounds I obtained by the process of the present invention may be isolated from solutions or suspensions thereof in known manner; however, it is to be noted that after the reaction has taken place the cation Z (see Formula II above) has combined with the Hal portion of compound III above and that the resulting chlorides or bromides, e.g. NaCl, NaBr, KCl, KBr, $NH_4Cl$, $NH_4Br$, $(CH_3)_3N \cdot HBr$ or $(CH_3)_3N \cdot HCl$, are insoluble in many solvents (other than water) and must therefore first be separated off, e.g. by filtering or extracting with water, if necessary after dissolution of the phosphoric acid derivative of the Formula I by warming the reaction medium or the addition of a suitable solvent. Only after these chlorides or bromides have been removed is it possible to isolate the end product, e.g. by evaporating the solvent or by precipitation with a suitable agent for this purpose.

The compounds of the Formula I are relatively stable on storage, soluble in oils as well as in many organic solvents. They are outstandingly suitable for protecting plants from pests, especially insects.

The combating of pests wtih the compounds I is suitably effected in such a way that a compound I is mixed with an emulsifier, e.g. a liquid polyglycol ether which has resulted from a high molecular weight alcohol, mercaptan or alkylphenol by the addition of ethylene oxide, the resulting mixture is then emulsified in water and the emulsion is applied to the surface to be treated, e.g. by spraying.

In order to facilitate emulsification or dissolution of the compounds I, a suitable organic solvent, for example a mono- or polyalcohol, ketone, aromatic hydrocarbon or mineral oil may further be added as solubilizer. However, it is likewise possible to incorporate, for the purpose of producing a product capable of suspension in water, a solid carrier, for example talc, kaolin, diatomaceous earth or bentonite. The liquid or pulverulent composition having as its active constituent a compound I, before use, is emulsified or dispersed in water, it being suitable for the resulting emulsion or dispersion to contain 0.005–0.2% of the said compound I.

However, it is possible to work up the compound to form a strewing or dusting agent without the addition of any emulsified, but with an inert carrier, optionally with the addition of an adhesive; examples of such inert carriers are talc, kaolin, diatomaceous earth, bentonite or a mixture thereof.

The active agents are worked up to 25% emulsion concentrates or 25% spraying powders in order to test their insecticidal/acaricidal effects; all percentages referred to herein are by weight.

Example of an emulsion concentrate (for liquid and low melting point solid active agents):

|  | Percent |
|---|---|
| Active agent | 25 |
| Isooctylphenyldecaglycol ether | 25 |
| Acetone | 50 |

Example of a spraying powder (for crystalline active agents of melting point above 65° C):

|  | Percent |
|---|---|
| Active agent | 25 |
| Soybean albumin extract | 7.8 |
| Dextrin | 2.6 |
| Sodium salt of dinaphthylmethane-disulphonic acid (98%) | 9.4 |
| Ammonium caseninate | 1.0 |
| Sodium salt of dodecylbenzenesulphonic acid (technical, 75%) | 2.1 |
| Diatomaceous earth | 52.1 |

The preparations are dispersed in water by stirring to form 0.05% or 0.0125% emulsions or suspensions which are ready for spraying.

In testing the effect of the compounds of Formula I the following test procedures were used.

(a) INSECTICIDAL CONTACT EFFECT TEST (aa) Contact effect of dry layer

Insect: Bruchidius obtectus (bean beetle), imagines.—About 0.1–0.2 ml. of liquor per dish are sprayed into 7 cm. Petri dishes by means of a spray nozzle. The liquor concentration amounts to 0.05% and 0.0125% of active agent. After drying the layer for about 4 hours, 10 Bruchidius imagines are place in each dish and covered with a cover of fine mesh brass wire netting. The animals are kept at room temperature without feed for 48 hours and the dead animals are then counted out. The mortality is stated as a percentage.

(ab) Contact effect by direct spraying

Insect: Anagesta (Ephestia) kuehniella (flour moth), caterpillars.—On the day before treatment 10 catepillars each of 10–12 mm. length are counted out into each of a number of 7 cm. Petri dishes and kept without feed until treatment. They are then directly sprayed with a spray nozzle in the open dishes in such a way that the liquor amount per dish is 0.1–0.2 ml. The dishes are covered with the above described netting cover. After the layer has dried, a wafer is present as feed and renewed as required. After 5 days the dead animals are counted out. The mortality figure is stated as a percentage.

(b) FEED EFFECT OF A DRY LAYER ON TRADESKANTIA LEAVES

Insect: Carausius morosus (Indian locust).—A cut off Tradeskantia branch is immersed for 3 seconds in a moderately stirred liquor. The stem is then inserted into a small glass tube with water and placed into a glass dish of 14 cm. diameter. 10 Carausius larvae II are counted into the dish which is closed with a mesh lid and after 5 days the dead or paralyzed animals are counted out. The mortality is stated as a percentage.

In the following examples, the parts and percentages are by weight and the temperatures stated in degrees centigrade.

In these examples the production of the intermediate products of the formula

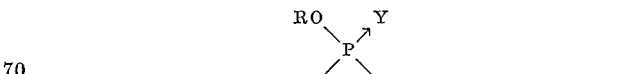

is effected as follows. 1 mol of triethylamine and 1 mol of an amine $R_1$—$NH_2$ dissolved in ethyl ether or chloroform is added at —5° to 0° to 1 mol of the compound ROP(Y)Hal$_2$ dissolved in ethyl ether or chloroform. After the reaction is complete, the solution is briefly washed with ice water, then dried and the solvent distilled off in a vacuum; any solvent present may be distilled off in a vacuum at a low temperature, e.g. 0° to 10° C. The intermediate compounds of the Formula III cannot be distilled; however, the evaporation residue is constituted by sufficiently pure Compound III so that it can be used without further purification for the reaction with the salt of the 2-hydroxyquinoxaline.

*Example A*

168 parts (1 mol) of the dry sodium salt of the formula:

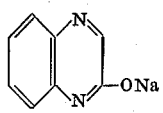   V are suspended in 785 parts of acetonitrile and 177 parts (1.03 mol) of the compound of the formula

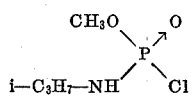   VI is added dropwise at 0°; after stirring for 15–60 hours at room temperature, sodium chloride is filtered off, the acetonitrile is evaporated in a vacuum, the residue is taken up in xylene and washed with dilute acid and water. After drying, evaporating and treatment in a high vacuum at 50°, a brown oil results which after purification with charcoal in ether is crystallized from ether/petroleum ether (compare Example 1 in the table below).

*Example B*

The 177 parts of the compound of the Formula VI in Example A are replaced with 165 parts (1.03 mol) of the compound of the formula

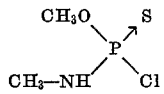   VII reaction is effected first at room temperature and then for 1–2 hours at 70°, the xylene solution resulting on isolation is purified with water and the xylene is distilled off. An oil with good insecticidal properties is obtained (compare Example 15 in the table).

*Example C*

146 parts (1 mol) of 2-hydroxyquinoxaline of Formula II (wherein $R_3=R_2=Z=H$) are suspended in 785 parts of acetonitrile and 189 parts (1.1 mol) of a compound of the formula

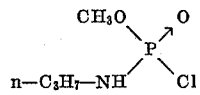

are then added to this suspension at 20° and 101 parts (1 mol) of triethylamine are added dropwise over a period of one hour. After stirring for 15 hours at room temperature, the resulting triethylamine hydrochloride precipitate is filtered off, the acetonitrile evaporated in a vacuum, the residue taken up in 500 parts of xylene and washed with water. After drying, evaporation and treatment in a high vacuum at 50°, a brown oil results which gradually solidifies; it can be purified further by recrystallization from ether (compare Example 4 in the table).

The following table contains a number of (thio)-phosphoric acid amide esters of the formula

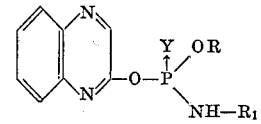   VIII according to the invention which compounds are characterized by the symbols R, $R_1$ and Y as well as the analysis figures and physical and biological properties.

All active agents were supplied for biological evaluation as 25% spraying powder or as 25% emulsion concentrates. The biological results are stated according to the following scheme:

Br: Effect on Bruchidius, active substance concentration 0.0125% after 2 days
Ep: Effect on Ephestia, active substance concentration 0.05% after 5 days
Car: Effect on Carausius, active substance concentration 0.0125% after 5 days.

TABLE.—PROPERTIES OF THE COMPOUNDS OF FORMULA VIII

| | | | Analyses, calculated/found | | Yield pure, percent | M.P. or $n_D^{20}$ | Biological effect | | | Toxicity (rats) LD₅₀ oral, mg./kg. |
|---|---|---|---|---|---|---|---|---|---|---|
| R | R¹ | Y | N | P | | | Br | Ep | Car | |
| Example Number: | | | | | | | | | | |
| 1 | Methyl | Iso-Propyl | O | 14.9/15.1 | 11.0/11.2 | 39 | 79.5° | 100 | | 90 | 63 |
| 2 | do | Methyl | O | 16.6/16.7 | 12.2/11.5 | 60 | 1.5740 | 100 | 100 | | 11 |
| 3 | do | Ethyl | O | 15.7/14.9 | 11.6/11.1 | 90 | 1.5633 | 100 | 100 | 70 | 30 |
| 4 | do | n-Propyl | O | 15.0/14.7 | 11.0/10.5 | 70 | 63° | 100 | 100 | | 108 |
| 5 | Ethyl | Methyl | O | | 11.6/11.4 | 47 | 53° | 100 | 100 | | |
| 6 | do | Ethyl | O | 14.9/15.1 | | 48 | 60° | 100 | 100 | 70 | |
| 7 | do | iso-Propyl | O | | 10.5/10.7 | 40 | 68° | 100 | 100 | 100 | |
| 8 | do | n-Propyl | O | 14.2/13.9 | | 72 | 28° | 100 | 100 | | |
| 9 | Methyl | n-Butyl | O | 14.2/14.4 | 10.5/10.0 | 60 | 1.5518 | 100 | 100 | | |
| 10 | Ethyl | iso-Butyl | O | 13.6/13.0 | 10.0/10.0 | 70 | 1.5427 | 100 | 100 | | |
| 11 | do | n-Butyl | O | 13.6/13.4 | 10.0/ 9.9 | 65 | 1.5436 | 100 | 100 | | |
| 12 | do | iso-Propyl | S | 13.5/13.3 | 10.0/ 9.5 | 35 | 62° | 70 | | 100 | |
| 13 | do | Ethyl | S | | 10.4/12.0 | 43 | 1.5508 | 80 | 80 | 100 | |
| 14 | Methyl | do | S | | 11.0/11.9 | 52 | 1.5558 | 100 | 60 | 70 | |
| 15 | do | Methyl | S | | 11.5/11.4 | 68 | 1.5902 | 100 | 100 | 100 | |
| 16 | Ethyl | do | S | | 11.0/11.4 | 80 | 1.5881 | 100 | 100 | 100 | |
| 17 | Methyl | sec-Butyl | O | 14.2/14.1 | 10.5/10.1 | 73 | 76° | 100 | 100 | | 60 |

I claim:
1. A compound of the formula

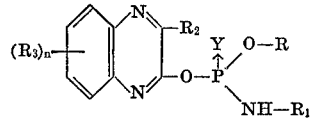   I wherein R is lower alkyl,
$R_1$ is alkyl with 1 to 4 carbon atoms,
$R_2$ is a hydrogen atom or the methyl or methoxy radical,
$R_3$ is a hydrogen atom, a halogen atom, lower alkyl radical or nitro,
Y is O or S,
and $n$ is 1 or 2.

2. A compound according to claim 1, in which each of $R_3$ and $R_2$ is a hydrogen atom.

3. A compound according to claim 2, in which R is the methyl radical, $R_1$ is the iso-propyl radical and Y is O.

4. A compound according to claim 2 (in which R is the methyl radical, $R_1$ is the methyl radical and Y is O.

5. A compound according to claim 2, in which R is the methyl radical, $R_1$ is the ethyl radical and Y is O.

6. A compound according to claim 2, in which R is the methyl radical, $R_1$ is the n-propyl radical and Y is O.

7. A compound according to claim 2, in which R is the ethyl radical, $R_1$ is the methyl radical and Y is O.

8. A compound according to claim 2, in which R is the ethyl radical, $R_1$ is the ethyl radical and Y is O.

9. A compound according to claim 2, in which R is the ethyl radical, $R_1$ is the iso-propyl radical and Y is O.

10. A compound according to claim 2, in which R is the ethyl radical, $R_1$ is the n-propyl radical and Y is O.

11. A compound according to claim 2, in which R is the methyl radical, $R_1$ is the n-butyl radical and Y is O.

12. A compound according to claim 2, in which R is the ethyl radical, $R_1$ is the iso-butyl radical and Y is O.

13. A compound according to claim 2, in which R is the ethyl radical, $R_1$ is the n-butyl radical and Y is O.

14. A compound according to claim 2, in which R is the ethyl radical, $R_1$ is the iso-propyl radical and Y is S.

15. A compound according to claim 2, in which R is the ethyl radical, $R_1$ is the ethyl radical and Y is S.

16. A compound according to claim 2, in which R is the methyl radical, $R_1$ is the ethyl radical and Y is S.

17. A compound according to claim 2, in which R is the methyl radical, $R_1$ is the methyl radical and Y is S.

18. A compound according to claim 2, in which R is the ethyl radical, $R_1$ is the methyl radical and Y is S.

19. A compound according to claim 2, in which R is the methyl radical, $R_1$ is the sec-butyl radical and Y is O.

References Cited

UNITED STATES PATENTS 3,150,149    9/1964    Uhlenbroek et al. ____ 260—250

FOREIGN PATENTS 1,081,249    8/1967    Great Britain _____ 260—250

NICHOLAS S. RIZZO, Primary Examiner

U.S. Cl. X.R.

424—250